United States Patent
Han et al.

(10) Patent No.: US 11,164,409 B2
(45) Date of Patent: Nov. 2, 2021

(54) METHOD AND DEVICE FOR AUTHENTICATING VEHICLE SMART KEY

(71) Applicant: Samsung Electronics Co., Ltd., Suwon-si (KR)

(72) Inventors: Kwanghoon Han, Suwon-si (KR); Ho Yang, Hwaseong-si (KR); Sungmin Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/484,294

(22) PCT Filed: Feb. 1, 2018

(86) PCT No.: PCT/KR2018/001397
§ 371 (c)(1),
(2) Date: Aug. 7, 2019

(87) PCT Pub. No.: WO2018/147595
PCT Pub. Date: Aug. 16, 2018

(65) Prior Publication Data
US 2020/0005571 A1    Jan. 2, 2020

(30) Foreign Application Priority Data
Feb. 13, 2017   (KR) .......................... 10-2017-0019419

(51) Int. Cl.
*G07C 9/00* (2020.01)
*B60R 25/01* (2013.01)
(Continued)

(52) U.S. Cl.
CPC .......... *G07C 9/00309* (2013.01); *B60R 25/01* (2013.01); *B60R 25/245* (2013.01);
(Continued)

(58) Field of Classification Search
CPC ......... B60R 25/01; B60R 25/10; B60R 25/24; B60R 25/245; B60R 25/246; G06F 21/30;
(Continued)

(56) References Cited

U.S. PATENT DOCUMENTS 8,930,045 B2     1/2015 Oman et al.
9,456,344 B2 *   9/2016 Ignatchenko ........... H04L 63/08
(Continued)

FOREIGN PATENT DOCUMENTS

CN       1791882 A     6/2006
CN     101438186 A     5/2009
(Continued)

OTHER PUBLICATIONS

Andy Greenberg Security, Radio Attack Lets Hackers Steal 24 Different Car Models, https://www.wired.com/2016/03/study-finds-24-car-models-open-unlocking-ignition-hack, Mar. 21, 2016.
(Continued)

*Primary Examiner* — Yong Hang Jiang
(74) *Attorney, Agent, or Firm* — Jefferson IP Law, LLP (57) ABSTRACT

Disclosed are a communication method for merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail business, security and safety related services, and the like) on the basis of 5G communication technology and IoT-related technologies. According to various embodiments of the disclosure, a method for authenticating a smart key of an electronic device comprises the steps of: transmitting an authentication request in a predetermined cycle; receiving authentication responses from a smart key device; determining whether there is a relay attack
(Continued)

on the basis of the interval of the received authentication responses; and authenticating the smart key device when it is determined that there is no relay attack. However, the disclosure is not delimited to the embodiment above, and other embodiments are possible.

12 Claims, 12 Drawing Sheets

(51) Int. Cl.
*B60R 25/24* (2013.01)
*H04L 9/32* (2006.01)

(52) U.S. Cl.
CPC .. *H04L 9/3226* (2013.01); *G07C 2009/00555* (2013.01); *G07C 2209/63* (2013.01)

(58) Field of Classification Search
CPC ........... G07C 2009/00555; G07C 2009/00793; G07C 2209/63; G07C 9/00309; H04L 9/3226

See application file for complete search history.

(56) References Cited

U.S. PATENT DOCUMENTS

| | | | | |
|---|---|---|---|---|
| 9,849,860 | B2* | 12/2017 | Miyazawa | ............... B60R 25/24 |
| 2002/0163419 | A1 | 11/2002 | Ott | |
| 2004/0052374 | A1 | 3/2004 | Lee et al. | |
| 2006/0202798 | A1* | 9/2006 | Baumgartner | ...... B60R 25/2072 |
| | | | | 340/5.61 |
| 2007/0030118 | A1 | 2/2007 | Nowottnick | |
| 2009/0171621 | A1 | 7/2009 | Wilcox et al. | |
| 2010/0304690 | A1* | 12/2010 | Proefke | ................... B60R 25/24 |
| | | | | 455/69 |
| 2015/0002266 | A1 | 1/2015 | Brillon et al. | |
| 2015/0015367 | A1* | 1/2015 | Lin | ......................... B60R 25/20 |
| | | | | 340/5.63 |
| 2015/0120085 | A1* | 4/2015 | Sanji | ....................... B60R 25/00 |
| | | | | 701/1 |
| 2015/0302673 | A1 | 10/2015 | Seiberts et al. | |
| 2016/0267735 | A1 | 9/2016 | Hamada et al. | |
| 2016/0292940 | A1 | 10/2016 | Tschache | |
| 2016/0332597 | A1* | 11/2016 | Tokunaga | .......... G07C 9/00309 |
| 2019/0180542 | A1* | 6/2019 | Geier | ..................... H04K 3/825 |

FOREIGN PATENT DOCUMENTS

| | | |
|---|---|---|
| CN | 104240340 A | 12/2014 |
| CN | 104299295 A | 1/2015 |
| CN | 105966353 A | 9/2016 |
| CN | 106043232 A | 10/2016 |
| EP | 1 246 137 A1 | 10/2002 |
| KR | 10-1455801 B1 | 11/2014 |
| KR | 10-1533428 B1 | 7/2015 |
| WO | 2016/059451 A1 | 4/2016 |

OTHER PUBLICATIONS

European Search Report dated Jan. 8, 2020, issued in European Patent Application No. 18751705.7.
Chinese Office Action dated Jun. 16, 2021, issued in Chinese Application No. 201880011348.7.

* cited by examiner

ND DEVICE FOR
METHOD AND DEVICE FOR AUTHENTICATING VEHICLE SMART KEY

TECHNICAL FIELD

The disclosure relates to a method and device for performing smart key authentication by detecting a relay attack when the relay attack is present between a smart key and a vehicle.

BACKGROUND ART

In order to satisfy a wireless data traffic demand that tends to increases after the $4^{th}$-generation (4G) communication system commercialization, efforts to develop an improved 5 (5G) communication system or pre-5G communication system is being made. For this reason, the 5G communication system or pre-5G communication system is called a beyond 4G network communication system or a post LTE system. In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

As the data communication technology is advanced, the supply of smart keys capable of controlling the operation of a device to be controlled by only a signal without a physical contact with the device to be controlled is spread. For example, the use of a smart key for controlling a vehicle is gradually increasing.

However, the smart key may be exposed to a relay attack that intercepts information of the smart key because it controls a vehicle using communication. For example, although a smart key and a vehicle are disposed at a given distance or more, an Amplifying-Relaying device may midway forward a signal of the smart key to the vehicle. The vehicle that has obtained the signal of the smart key may perform the authentication of the smart key. Accordingly, the vehicle may be exposed to an outsider's crime.

DISCLOSURE OF INVENTION

Technical Problem

The disclosure is to block a relay attack by detecting the relay attack and to provide notification to a user in a smart key system.

Solution to Problem

According to an embodiment of the disclosure, a method for an electronic device to authenticate a smart key may include transmitting an authentication request in a given cycle, receiving an authentication response from a smart key device, identifying whether a relay attack is present based on an interval between the received authentication responses, and authenticating the smart key device based on a relay attack being not present.

According to an embodiment of the disclosure, an authentication method of a smart key device includes receiving an authentication request from a vehicle in a given cycle, identifying whether a relay attack is present based on an interval between the received authentication requests, and responding to a detection of an approach confirmation signal transmitted by the vehicle based on the relay attack being not present, wherein the approach confirmation signal is transmitted based on the smart key being authenticated.

According to an embodiment of the disclosure, an electronic device may include a transceiver transmitting and receiving signals and a controller configured to transmit an authentication request in a given cycle, receive an authentication response from a smart key device, identify whether a relay attack is present based on an interval between the received authentication responses, and authenticate the smart key device based on a relay attack being not present.

According to an embodiment of the disclosure, a smart key device includes a transceiver transmitting and receiving signals and a controller configured to receive an authentication request from a vehicle in a given cycle, identify whether a relay attack is present based on an interval between the received authentication requests, and respond to a detection of an approach confirmation signal transmitted by the vehicle based on the relay attack being not present, wherein the approach confirmation signal is transmitted based on the smart key being authenticated.

Advantageous Effects of Invention

According to various embodiments of the disclosure, a safer smart key system against an external attack can be constructed because a relay attack can be detected and corresponding follow-up measures can be taken.

MODE FOR THE INVENTION

Hereinafter, the disclosure is described with reference to the accompanying drawings. Although specific embodiments of the disclosure are illustrated in the drawings and a related detailed description is given, the disclosure may be modified in various ways and the disclosure may have various embodiments. Accordingly, the disclosure is not intended to be limited to the specific embodiments, but it should be understood that the specific embodiments include all modifications, equivalents to substitutions that are included in the spirit and technological scope of the disclosure. In relation to a description of the drawings, similar reference numerals are used throughout the drawings to refer to similar elements.

Expressions, such as "include" and "may include" which may be used in the disclosure, indicate the existence of a disclosed corresponding function, operation or element, and do not limit one or more additional functions, operations or elements. Furthermore, it is to be understood that in the disclosure, a term, such as "include" or "have", is intended to indicate the existence of a characteristic, number, step, operation, element, or component or a combination of them in the specification and does not exclude the existence of one or more other characteristics, numbers, steps, operations, elements, or components or a combination of them or the possibility addition of them.

Furthermore, in the disclosure, an expression "and/or" includes any of words listed together and all combinations of the words. For example, A and/or B may include A, may include B, or may include both A and B.

Furthermore, in the disclosure, expressions, such as "the first", "the second", "first", and "second", may indicate various elements of the disclosure, but do not limit corresponding elements. For example, the expressions do not limit order and/or importance of corresponding elements. The expressions may be used to distinguish one element from other elements. For example, a first user device and a second user device are all user devices and are different user devices. For example, a first element may be named a second element without departing from the range of right of the disclosure. Likewise, a second element may be named a first element.

When it is described that one element is "connected to" or "coupled to" the other element, it should be understood that the one element may be directly connected or coupled to the other element, but a third element may be interposed between the two elements. In contrast, when it is described that one element is "directly connected to" or "directly coupled to" the other element, it should be understood that a third element is not interposed between the two elements.

Terms used in the disclosure are used to only describe specific embodiments and are not intended to restrict the disclosure. An expression of the singular number includes an expression of the plural number unless clearly defined otherwise in the context.

All terms used herein, including technical terms or scientific terms, have the same meanings as those commonly understood by a person having ordinary skill in the art to which the disclosure pertains, unless defined otherwise in the specification. Terms, such as those commonly used and defined in dictionaries, should be construed as having the same meanings as those in the context of a related technology, and should not be construed as having ideal or excessively formal meanings unless explicitly defined otherwise in the specification.

Figure 1A:
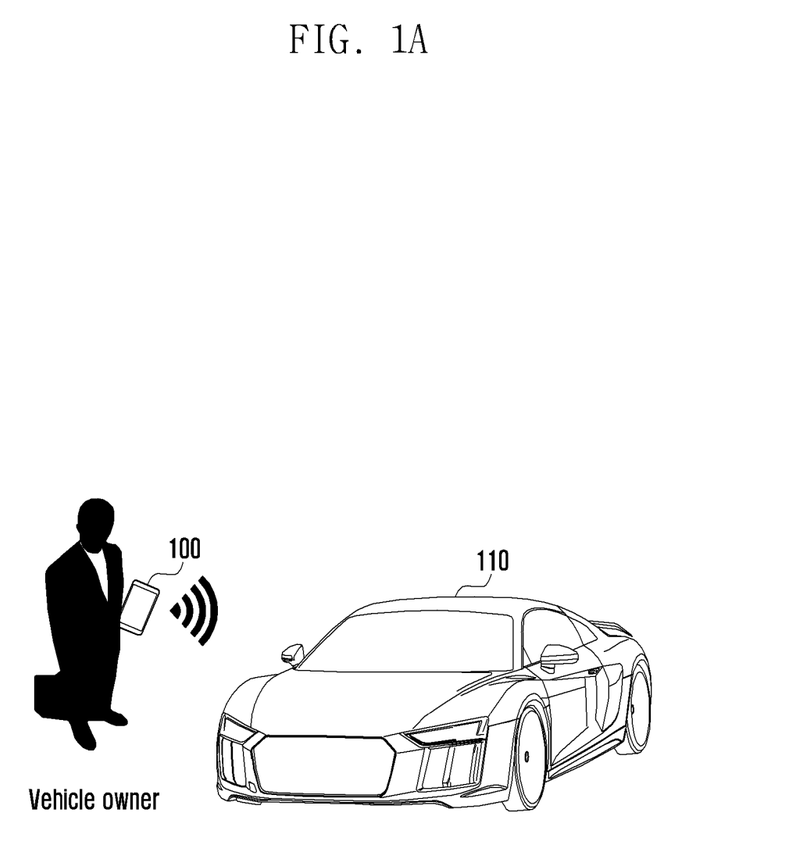
FIG. 1A shows a smart key system according to an embodiment of the disclosure.

FIG. 1A shows a smart key system according to an embodiment of the disclosure.

A smart key 100 may be used as a tool for controlling various functions of a vehicle 110. The smart key 100 may be registered in relation to the vehicle 110. When the smart key 100 approaches the vehicle 110 within a given range, the smart key 100 experiences an authentication procedure of identifying the smart key is a registered valid key. For example, when the smart key 100 detects an authentication request transmitted by the vehicle 110, the smart key 100 may transmit an authentication response to the vehicle 110. The vehicle 110 may check whether the smart key is proximate based on the size of the signal of the authentication response. The authentication response may include information on the smart key. The vehicle 110 may perform authentication based on the information of the smart key.

Figure 1B:
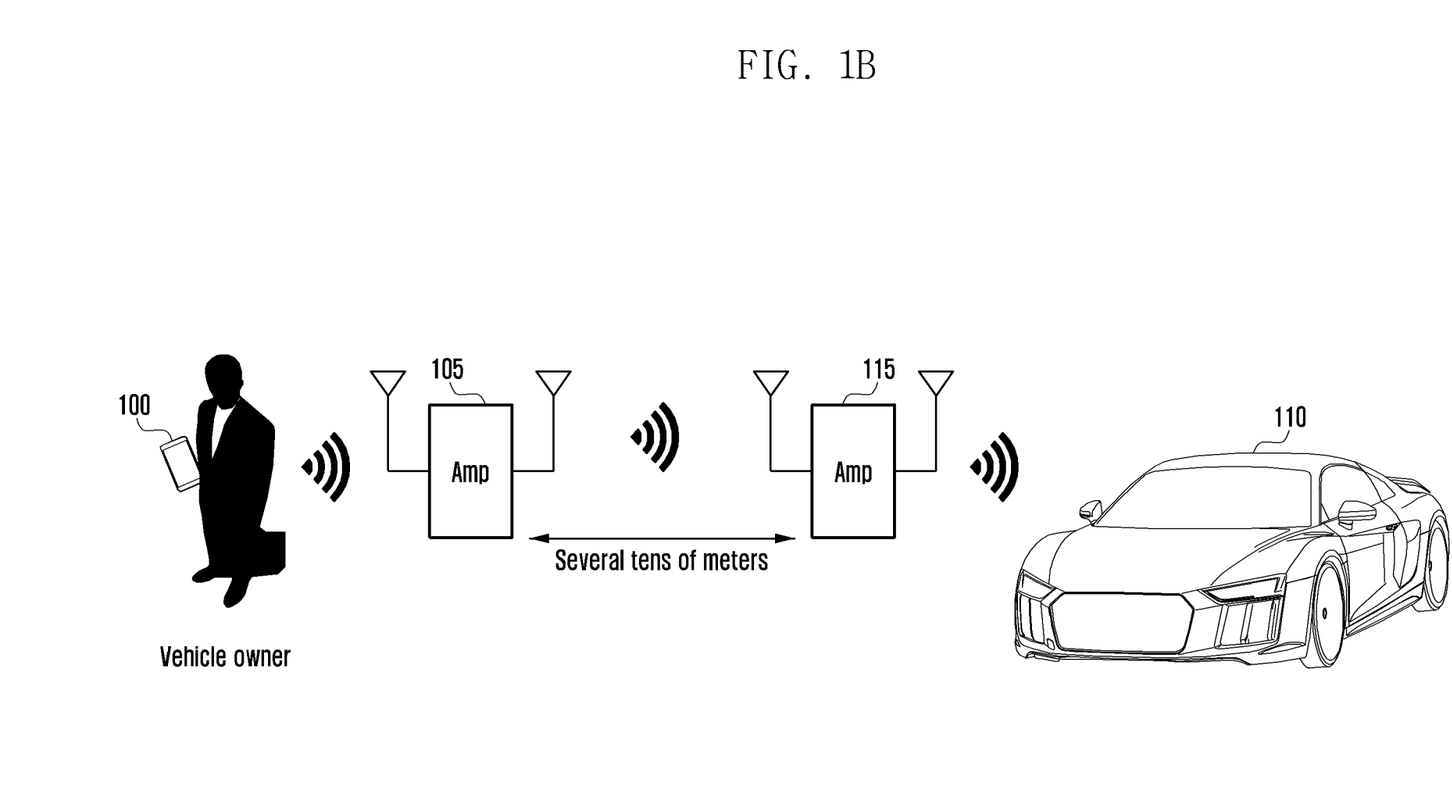
FIG. 1B is a diagram for illustrating a case where a relay attack occurs in a smart key system.

FIG. 1B is a diagram for illustrating a case where a relay attack occurs in a smart key system.

Although the smart key 100 does not approach the vehicle 110 within a given range, an Amplifying-Relaying device (hereinafter described as a hacking device) may be cut in between the smart key 100 and the vehicle 110, and may cheat the vehicle 110 as if the smart key 100 and the vehicle 110 are proximate by amplifying and relaying a signal. As described above, the authentication of the smart key 100 may be performed and the vehicle 110 may be fully controlled by a hacker. Such a situation is called a relay attack.

Figure 2:
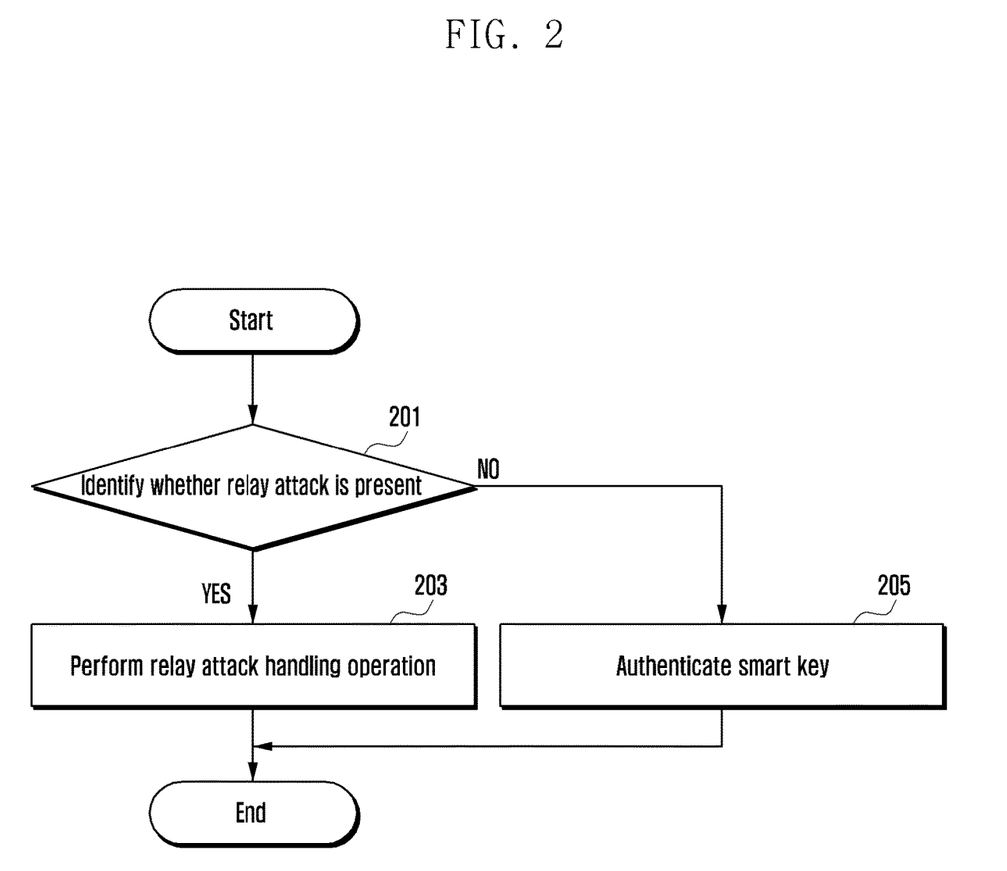
FIG. 2 is a flowchart showing an operation of a vehicle to prepare for a relay attack according to an embodiment of the disclosure.

FIG. 2 is a flowchart showing an operation of a vehicle (e.g., 110) to prepare for a relay attack according to an embodiment of the disclosure. The operation of the vehicle 110 may be performed by a smart key authentication device included in the vehicle 110, for example.

At step 201, the vehicle may identify whether a relay attack is present between the vehicle and a smart key. As will be described in detail below, the vehicle 110 may identify whether a relay attack is present based on the delay time of a signal or may identify whether a relay attack is present based on data received after a channel measurement result is fed back.

If it is identified that the relay attack is present, at step 203, the vehicle may perform a corresponding operation for the relay attack. For example, the vehicle may restrict a vehicle function (e.g., door lock setting, vehicle control hold), may output warning notification (e.g., light flickering, warning sound output), or may notify the smart key or a vehicle owner of a current condition.

If it is identified that a relay attack is not present, at step 205, the vehicle may perform authentication on the corresponding smart key. If the smart key has been authenticated, when the smart key and the vehicle are proximate, the vehicle may be controlled by the smart key.

Figure 3:
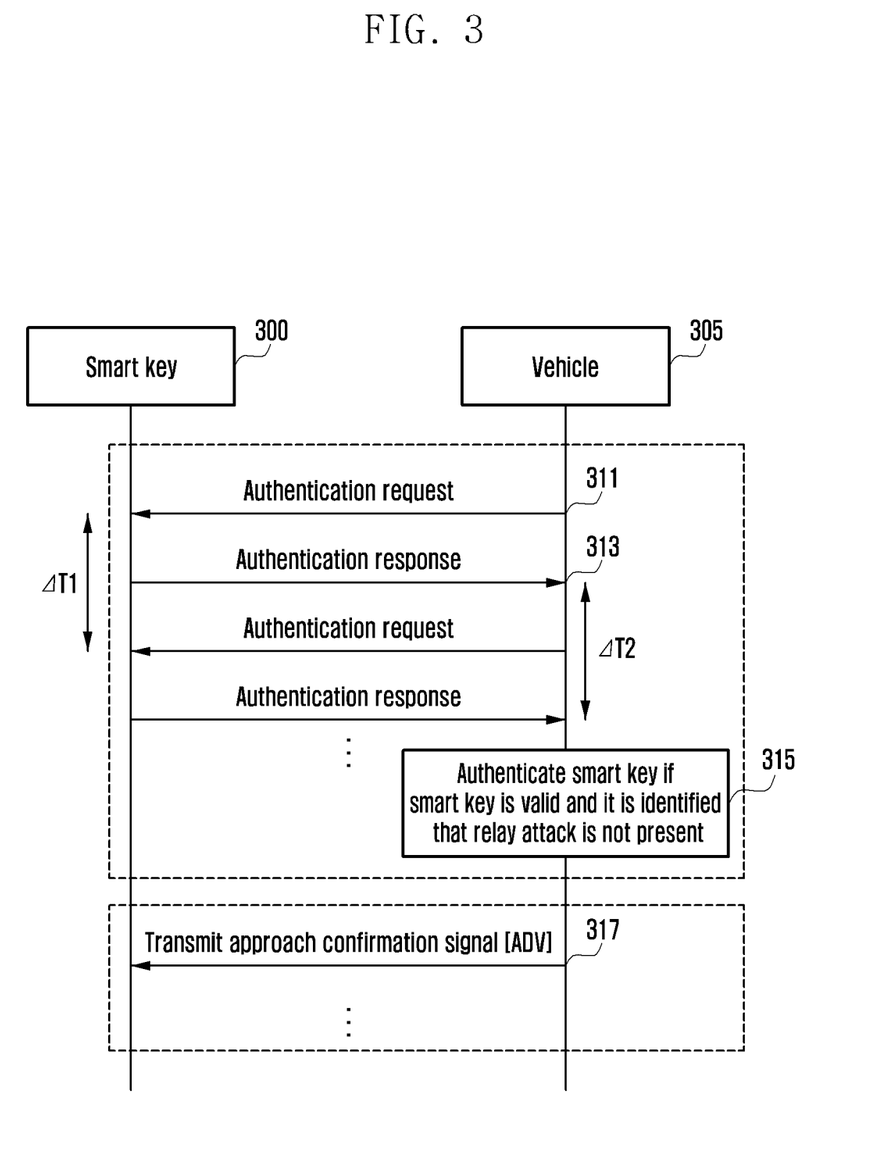
FIG. 3 is a diagram showing a method of authenticating a smart key according to an embodiment of the disclosure.

FIG. 3 is a diagram showing a method of authenticating a smart key according to an embodiment of the disclosure. FIG. 3 is related to an embodiment in which whether a relay attack is present is identified based on the delay time of a signal.

A vehicle 305 may perform a smart key authentication operation. At step 311, the vehicle 305 may periodically transmit an authentication request to a smart key device 300. When the smart key device 300 and the vehicle 305 are located within a given range, the smart key device may receive the authentication request and transmit an authentication response at step 313. The authentication response may include information on the smart key device 300, for example, user information or device ID information.

At step 315, the vehicle 305 may authenticate the smart key device 300 by identifying whether the smart key device is a registered valid key and whether a relay attack is present. For example, the vehicle 305 may measure an interval ($\Delta T2$) between authentication responses, and may identify that a relay attack is not present if the interval is within a given time interval.

If the smart key device 300 has been validly authenticated, at step 317, the vehicle 305 may transmit an approach confirmation signal (Adv) to the smart key device 300. If the smart key device 300 has approached the vehicle 305 within a given distance, it may detect the approach confirmation signal (Adv) and transmit a response to the approach confirmation signal.

Although not shown, the smart key device 300 may identify whether a relay attack is present by measuring an interval ($\Delta T1$) between authentication requests. For example, the smart key device 300 may measure the interval ($\Delta T1$) between authentication requests, and may identify that a relay attack is not present if the interval is within a given time interval. If a relay attack is not present, the smart key device 300 may normally perform a control function on the vehicle 305. If a relay attack is present, the smart key device 300 may not transmit a response although the approach confirmation signal (Adv) is detected. Furthermore, notification for notifying a user of the relay attack may be output through the smart key device 300, notification may be output to the terminal of a given user or notification for the relay attack may be forwarded to the vehicle 305.

Figure 4:
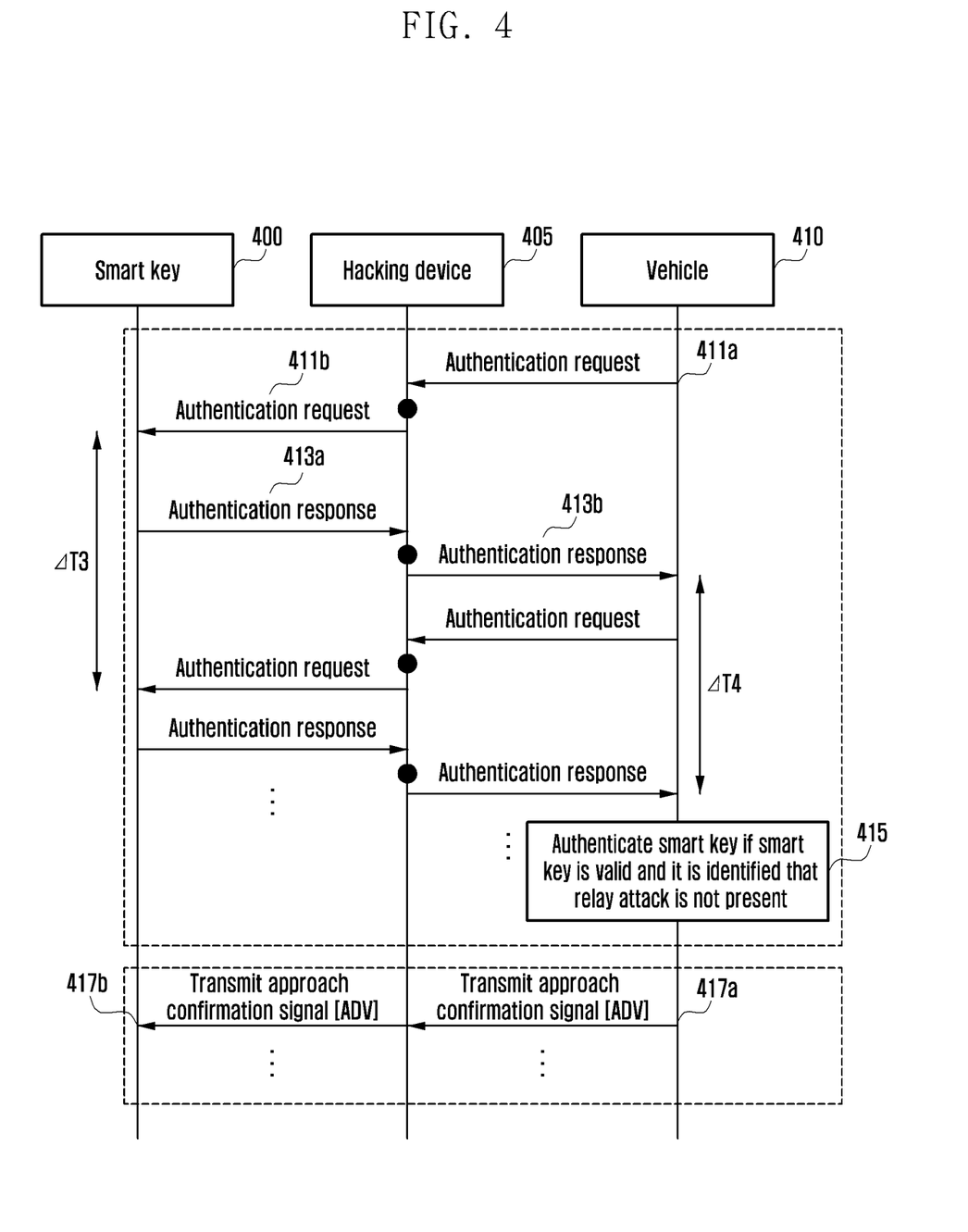
FIG. 4 is a diagram showing a method of authenticating a smart key when a relay attack occurs according to an embodiment of the disclosure.

FIG. 4 is a diagram showing a method of authenticating a smart key when a relay attack occurs according to an embodiment of the disclosure.

A vehicle 410 may perform a smart key authentication operation. At step 411*a*, the vehicle 410 may periodically transmit an authentication request. In general, if a smart key device 400 is not positioned within a given range of the vehicle 410, the smart key device 400 cannot detect the authentication request. However, if a relay attack by a hacking device 405 is present between the smart key device and the vehicle, at step 411*b*, the hacking device 405 may forward the authentication request to the smart key device 400 by amplifying and relaying the authentication request, and forward it. At step 413*a*, the smart key device 400 may transmit an authentication response. Likewise, if the smart key device 400 is not positioned within a given range of the vehicle 410, the vehicle 410 cannot detect the authentication response. However, if a relay attack by the hacking device 405 is present between the smart key device and the vehicle, at step 413*b*, the hacking device 405 may forward the authentication response to the vehicle 410 by amplifying and relaying the authentication response. The authentication response may include information on the smart key device 400, for example, user information or device ID information.

At step 415, the vehicle 410 may authenticate the smart key device 400 by identifying whether the smart key device is a registered valid key and whether a relay attack is present. For example, the vehicle 410 may measure an interval ($\Delta T4$) between authentication responses, and may identify that a relay attack is present if the interval is out of a given time interval. For example, assuming that the time taken for a signal to be delayed by a relay attack is $\Delta R$, $\Delta T4$ may be a value that is $2*\Delta R$ greater than $\Delta T2$ measured when a relay attack is not present.

If the smart key device 400 has been validly authenticated, at step 417*a*, the vehicle 410 may transmit an approach confirmation signal (Adv). If the smart key device 400 is not located within a given distance from the vehicle 410, the smart key device 400 cannot detect the approach confirmation signal (Adv). However, if a relay attack by the hacking device 405 is present between the vehicle and the smart key device, at step 417*b*, the hacking device 405 may forward the approach confirmation signal (Adv) to the smart key device 400 by amplifying and relaying the approach confirmation signal. If the smart key device 400 is proximate to the vehicle 405 within a given distance, it may detect the approach confirmation signal (Adv).

Although not shown, the smart key device 400 may also identify whether a relay attack is present by measuring an interval ($\Delta T3$) between authentication requests. For example, the smart key device 400 may measure the interval ($\Delta T3$) between authentication requests, and may identify that a relay attack is not present if the interval is out of a given time interval. For example, assuming that the time taken for a signal to be delayed by a relay attack is $\Delta R$, $\Delta T3$ may be a value that is $2*\Delta R$ greater than $\Delta T1$ measured when a relay attack is not present.

If a relay attack is present, the smart key device 400 may not transmit a response although the approach confirmation signal (Adv) is detected. Furthermore, notification for notifying a user of the relay attack may be output through the smart key device 400, notification may be output to the terminal of a given user, or notification for the relay attack may be forwarded to the vehicle 410. Accordingly, although a relay attack is not properly detected by the vehicle 410, control of the vehicle 410 for security may be limited if the smart key device 400 detects the relay attack.

Figure 5A:
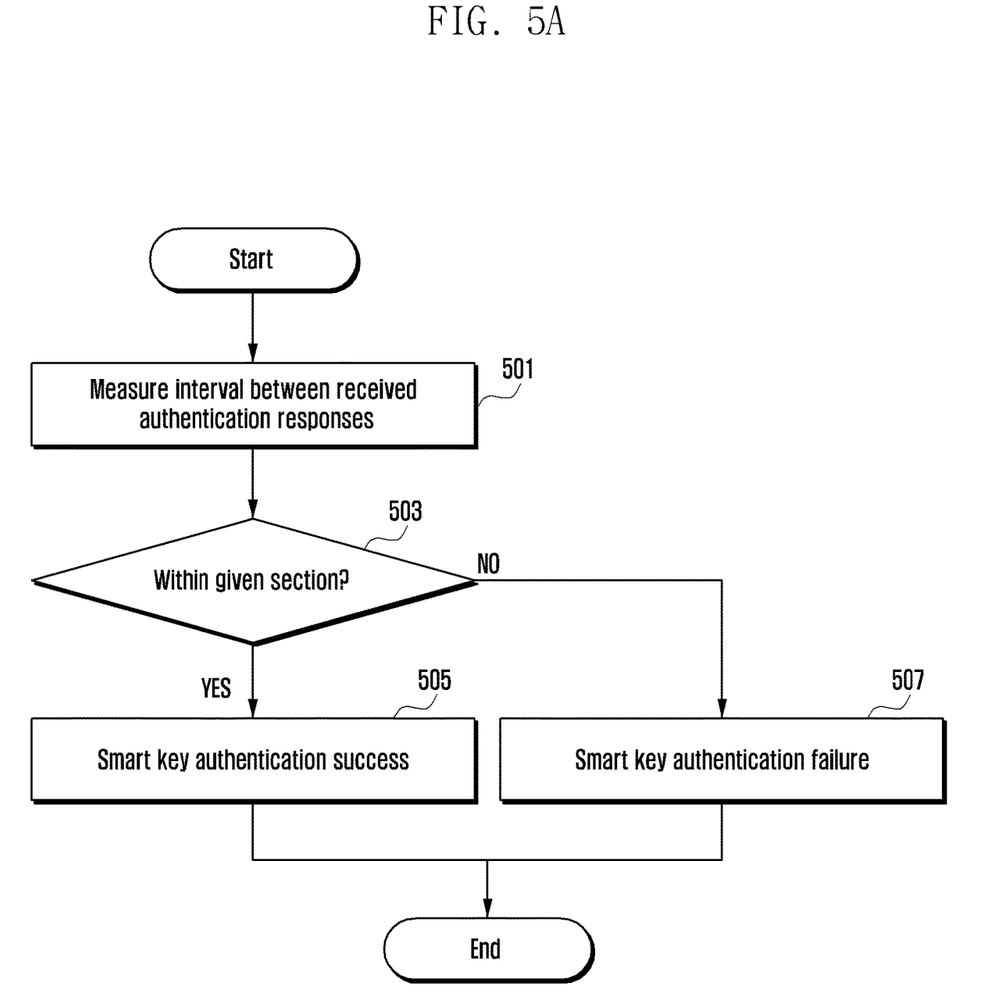
FIG. 5A is a flowchart showing a method of authenticating a smart key of a vehicle according to an embodiment of the disclosure.

FIG. 5A is a flowchart showing a method of authenticating a smart key of a vehicle (e.g., 305, 410) according to an embodiment of the disclosure. The operation of the vehicle may be performed by a smart key authentication device included in the vehicle, for example.

At step 501, the vehicle may measure a reception interval between authentication responses received from the smart key device. At step 503, the vehicle may check whether the reception interval between the authentication responses is within a given section. The given section is a preset value, and is a value related to a normal signal transmission time between the vehicle and the smart key device.

If the interval is within the given section, the vehicle may identify that a relay attack is not present. At step 505, the vehicle may successfully perform smart key authentication if the smart key device is a previously registered valid device.

If the interval is out of the given section, the vehicle may identify that a relay attack is present. At step 507, the vehicle may fail in smart key authentication although the smart key device is a previously registered valid device.

Figure 5B:
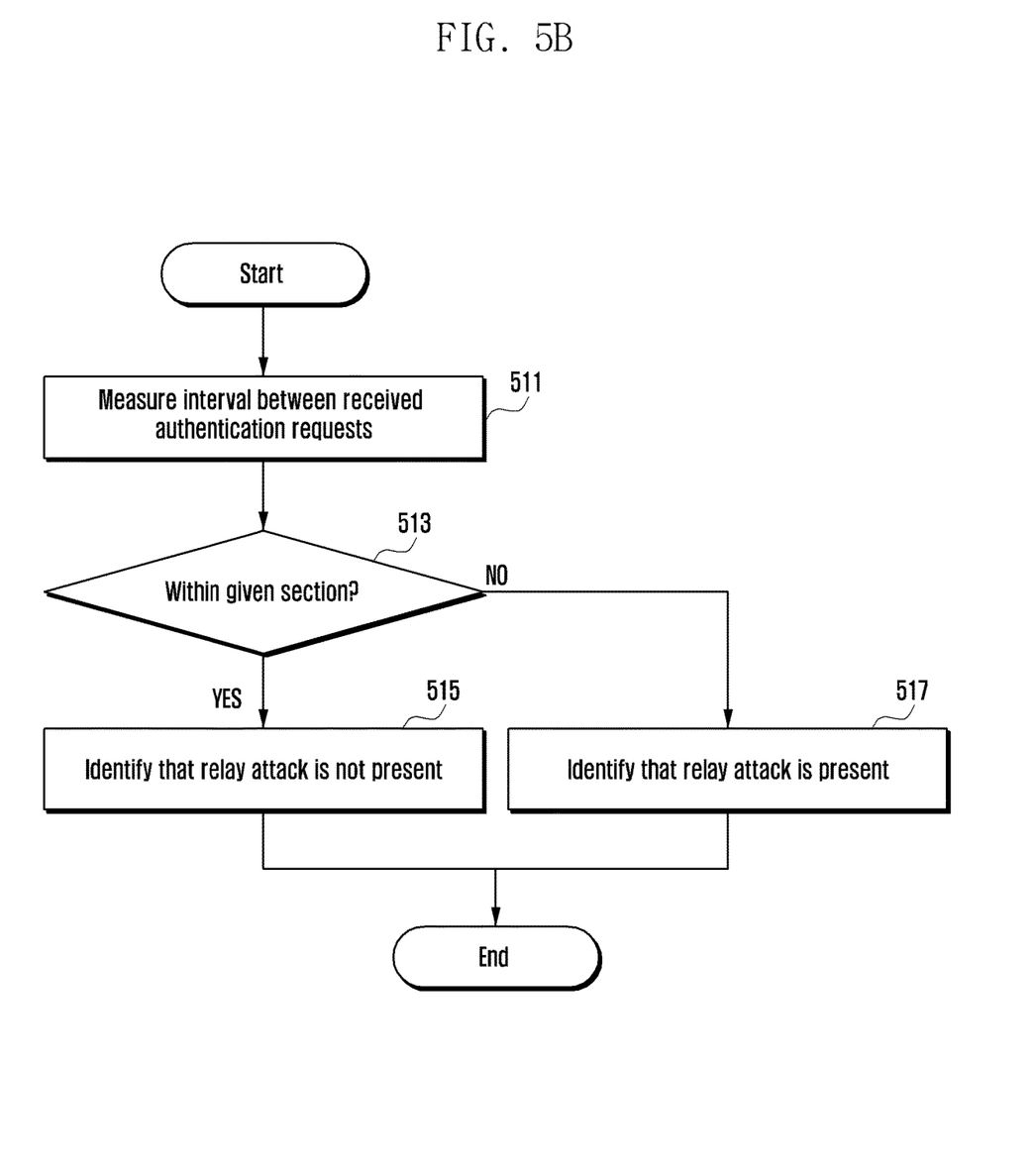
FIG. 5B is a flowchart showing an authentication method of a smart key device according to an embodiment of the disclosure.

FIG. 5B is a flowchart showing an authentication method of a smart key device (e.g., 300, 400) according to an embodiment of the disclosure.

At step 511, the smart key device may measure a reception interval between authentication requests received from a vehicle. At step 513, the smart key device may check whether the reception interval between the authentication requests is within a given section. The given section is a preset value, and is a value related to a normal signal transmission time between the vehicle and the smart key device.

If the interval is within the given section, at step 515, the smart key device may identify that a relay attack is not present, and may then perform a vehicle control-related operation.

If the interval is out of the given section, at step 517, the smart key device may identify that a relay attack is present, and may perform an operation, such as vehicle function restriction or relay attack notification output.

Figure 6:
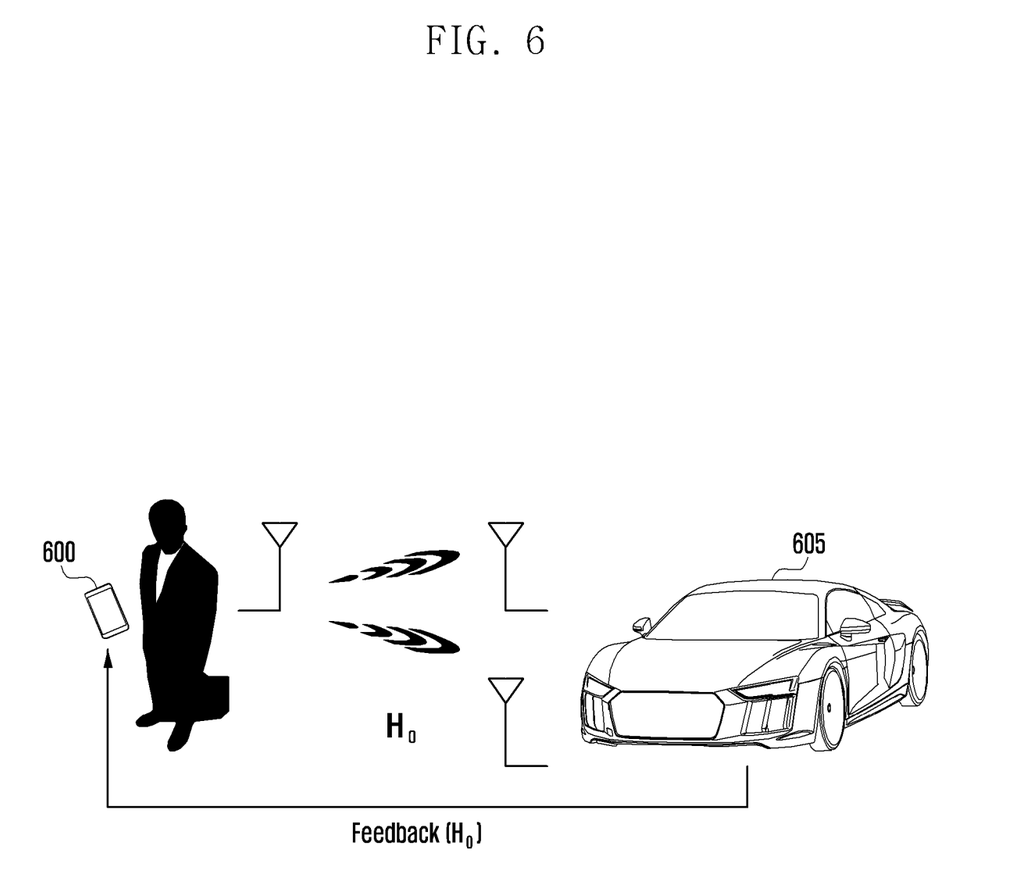
FIG. 6 is a diagram showing a method of authenticating a smart key according to another embodiment of the disclosure.

FIG. 6 is a diagram showing a method of authenticating a smart key according to another embodiment of the disclosure. FIG. 6 is related to an embodiment in which whether a relay attack is present is identified based on the multi-antenna channel uniqueness of a signal. For example, such an operation may be performed based on the delay time of a signal, described with reference to FIGS. 3 to 5, in parallel or selectively with respect to the operation of identifying a relay attack.

A direct channel for wireless communication is formed between a smart key device 600 and a vehicle 605. In this case, a generated channel measurement value may be defined as $H_0$. For example, the vehicle 605 may perform channel measurement based on a signal transmitted by the smart key device 600, and may feed a channel measurement value $H_0$ back to the smart key device 600.

The smart key device 600 may precode data, previously agreed to be transmitted, using the fed-back channel measurement value $H_0$, and may transmit the precoded data. The vehicle 605 may validly receive the data because the smart key device 600 transmits the data by incorporating the accurate channel measurement value $H_0$ into the data. Accordingly, the vehicle 605 that has validly received the previously agreed data may identify that a relay attack is not present. In this case, if the smart key is a previously registered valid device, the vehicle may perform smart key authentication.

Figure 7:
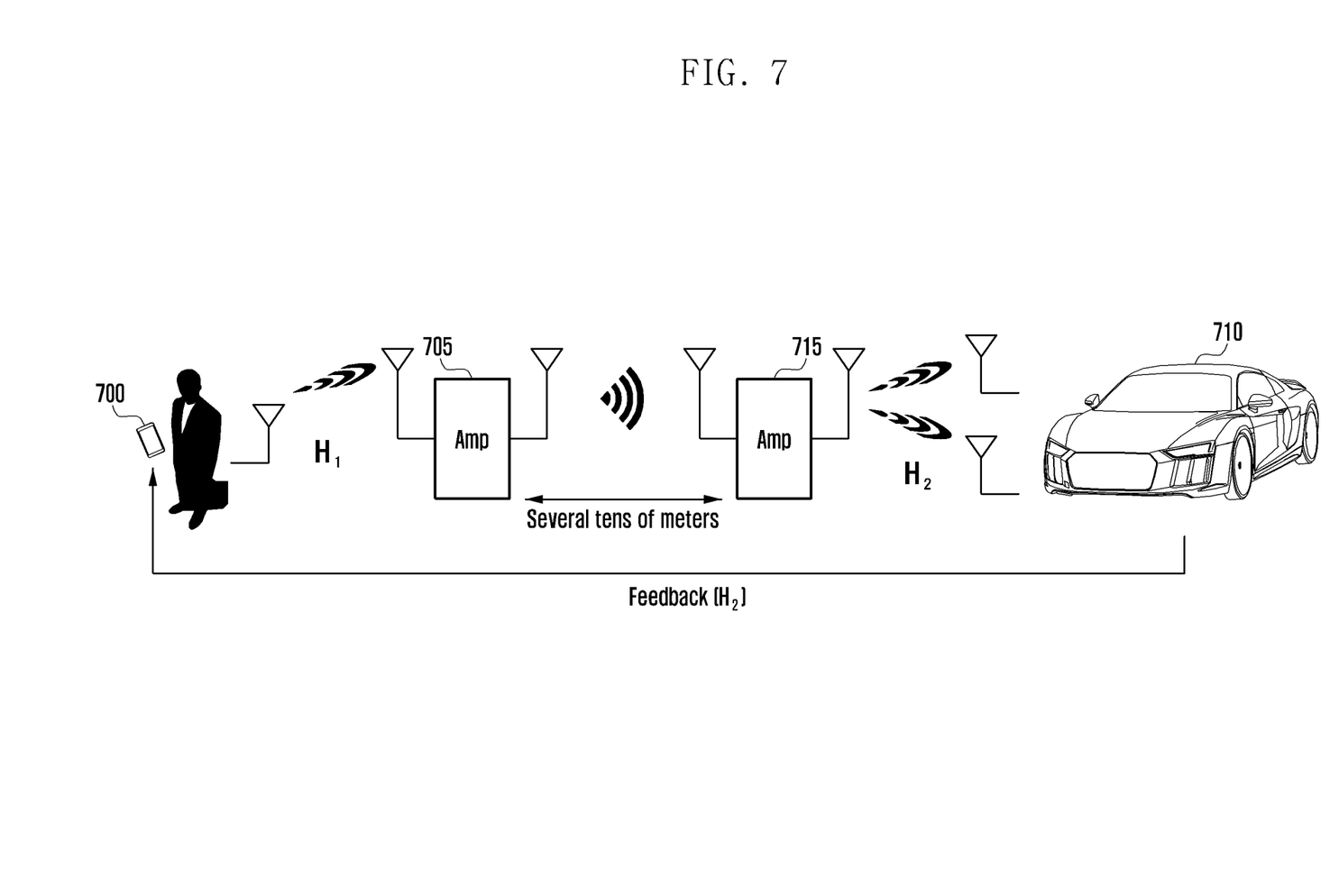
FIG. 7 is a diagram showing a method of authenticating a smart key when a relay attack occurs according to another embodiment of the disclosure.

FIG. 7 is a diagram showing a method of authenticating a smart key when a relay attack occurs according to another embodiment of the disclosure.

If a hacking device 705, 715 performs a relay attack midway, a direct channel is not formed between a smart key device 700 and a vehicle 710, and a channel ($H_1H_2$) in which a channel $H_1$ between the smart key device 700 and the hacking device 705 and a channel $H_2$ between the vehicle 710 and the hacking device 715 are mixed is formed between the smart key device 700 and the vehicle 710. If the vehicle 710 performs channel measurement, it may obtain a channel measurement value of the channel $H_2$. The vehicle 710 may feed the channel measurement value $H_2$ back to a terminal.

The smart key device 700 may precode data, previously agreed to be transmitted, using the fed-back channel measurement value $H_2$, and may transmit the precoded data. The vehicle 710 cannot validly receive the data because the smart key device 700 transmits the data by incorporating only the value $H_2$ into the data. Accordingly, the vehicle 710 that has not validly received the previously agreed data may identify that a relay attack is present. In this case, the vehicle may fail in smart key authentication although the smart key is a previously registered valid device. Furthermore, the vehicle may restrict a vehicle function, and may output relay attack notification or forward the relay attack notification to the smart key device 700.

Figure 8:
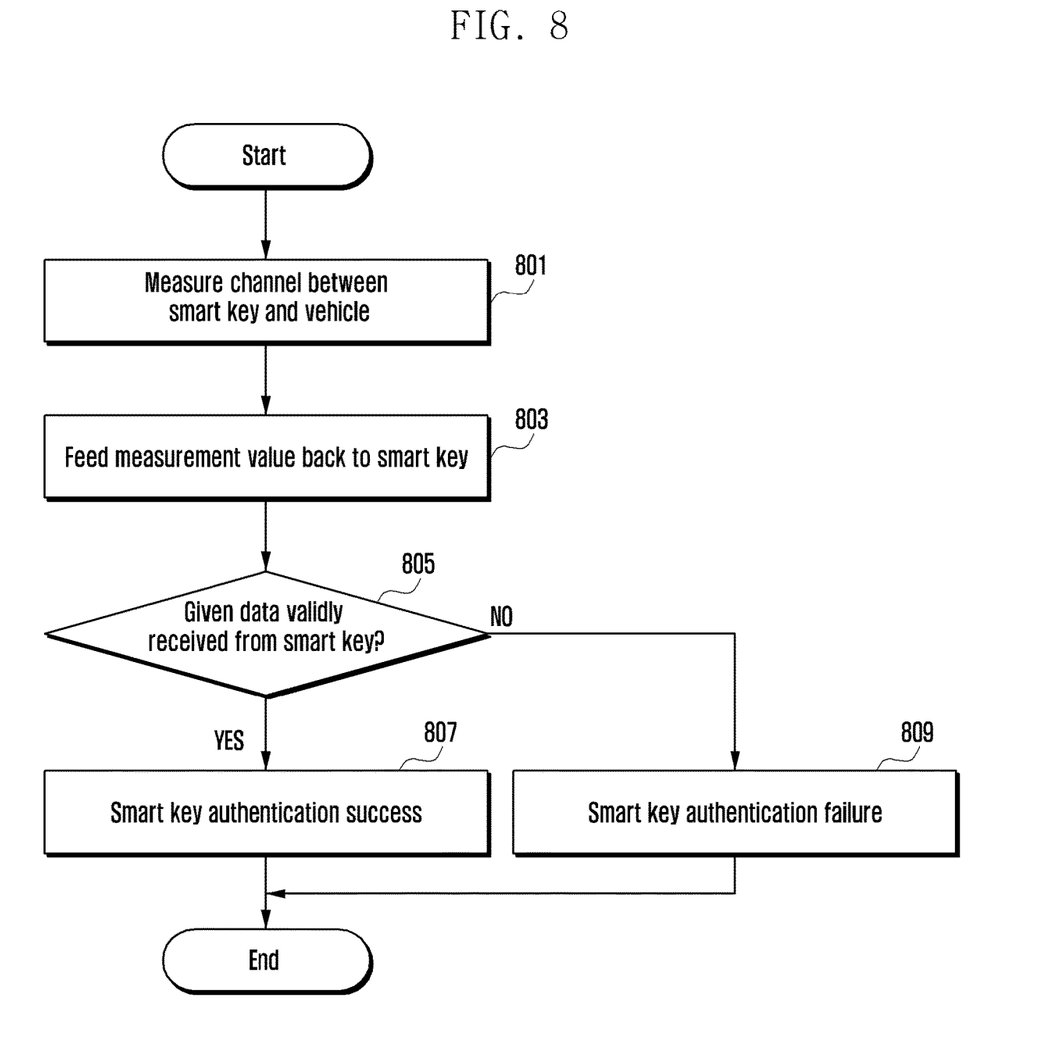
FIG. 8 is a flowchart showing a method of authenticating the smart key of a vehicle according to another embodiment of the disclosure.

FIG. 8 is a flowchart showing a method of authenticating a smart key of a vehicle (e.g., 605, 710) according to another embodiment of the disclosure. An operation of the vehicle may be performed by a smart key authentication device included in a vehicle, for example.

The vehicle may measure a channel between the vehicle and the smart key device at step 801, and may feed a channel measurement value back to the smart key device at step 803.

Thereafter, at step 805, the vehicle may identify whether previously agreed data has been validly received from the smart key device.

If the agreed data has been validly received, the vehicle may identify that a relay attack is not present, and may successfully perform smart key authentication if the smart key device is a previously registered valid device at step 807.

If the agreed data has not been validly received, the vehicle may identify that a relay attack is present, and may fail in smart key authentication although the smart key device is a previously registered valid device at step 809.

Figure 9:
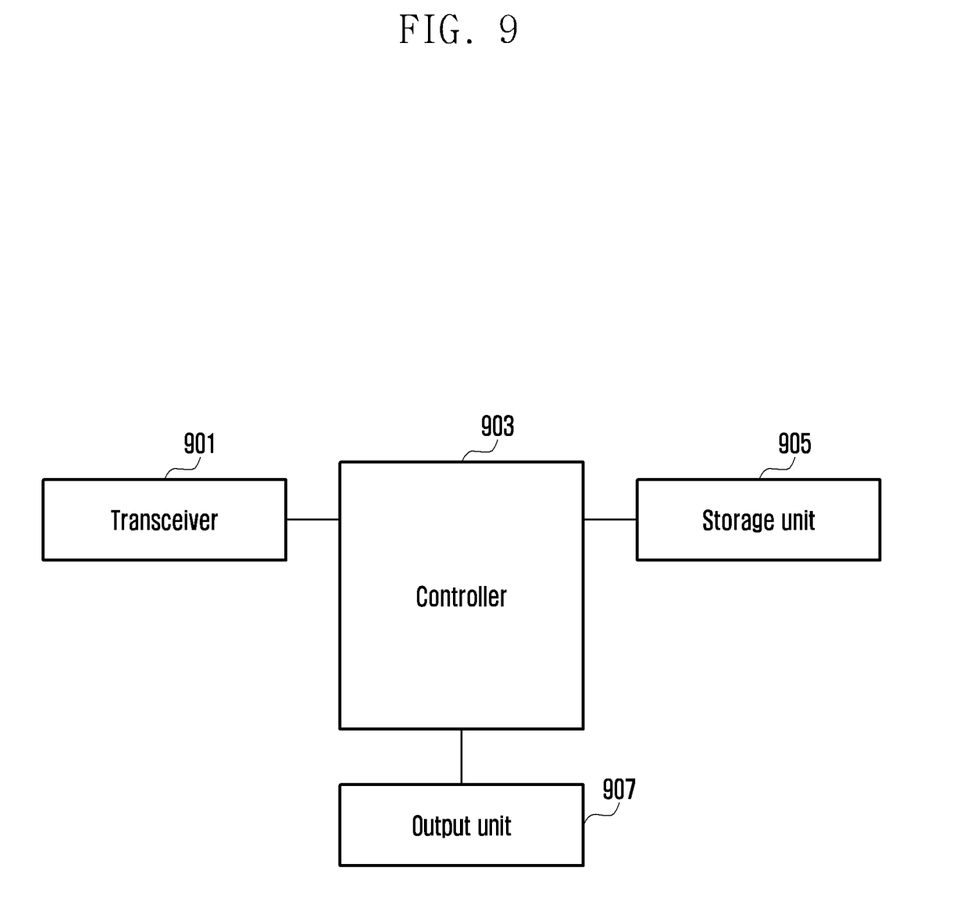
FIG. 9 is a block diagram showing the configuration of a smart key authentication device of a vehicle according to an embodiment of the disclosure.

FIG. 9 is a block diagram showing the configuration of a smart key authentication device of a vehicle according to an embodiment of the disclosure.

Referring to FIG. 9, the smart key authentication device of a vehicle may include a transceiver 901, a controller 903, a storage unit 905 and an output unit 907.

The transceiver 901 may include a module for communicating with a smart key device.

The controller 903 may include at least one processor. The controller 903 may control the operations of the transceiver 901, the storage unit 905 and the output unit 907. The controller 903 may control the operations of the smart key authentication device of a vehicle according to various embodiments of the disclosure described with reference to FIGS. 1 to 8. The controller 903 may identify whether a relay attack is present between a vehicle and a smart key device. As described above, the controller may identify whether a relay attack is present based on the delay time of a signal, or may identify whether a relay attack is present based on the uniqueness of a multi-antenna channel. If it is identified that a relay attack is not present, the controller 903 may succeed in smart key device authentication. In contrast, if it is identified that a relay attack is present, the controller 903 may fail in smart key device authentication, and may restrict a vehicle function or forward notification to a smart key device in preparation for the relay attack.

The storage unit 905 may store smart key device information. For example, user information related to a smart key device may be previously stored in the storage unit, and may be used upon smart key device authentication.

The output unit 907 may include a light or an audio output unit. The output unit 907 may control the flickering of the light or output a warning sound under the control of the controller 903 (e.g., if it is identified that a relay attack is present).

Figure 10:
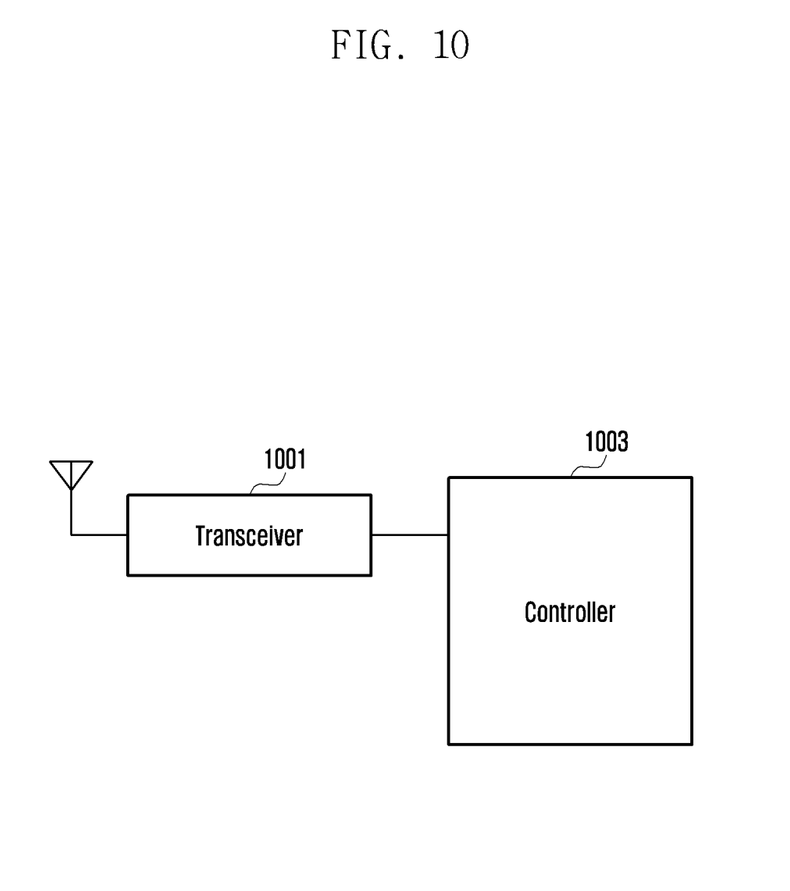
FIG. 10 is a block diagram showing the configuration of a smart key device according to an embodiment of the disclosure.

FIG. 10 is a block diagram showing the configuration of a smart key device according to an embodiment of the disclosure.

Referring to FIG. 10, the smart key device according to an embodiment of the disclosure may include a transceiver 1001 and a controller 1003.

The transceiver 1001 may include an RF module for remote communication or a module for short-distance communication, for example.

The controller 1003 may include at least one processor. The controller 1003 may control the operation of the transceiver 1001. The controller 1003 may control the operations of the smart key device according to various embodiments of the disclosure described with reference to FIGS. 1 to 8. For example, the controller 1003 may identify whether a relay attack is present between the smart key device and a vehicle, and may help the vehicle to identify whether a relay attack is present. As described above, whether a relay attack is present may be identified based on the delay time of a signal or may be identified based on the uniqueness of a multi-antenna channel. If it is identified that a relay attack is present, the controller 1003 may provide notification to a user, and may restrict the function of a vehicle or control the vehicle to output notification.

Each of the elements of the electronic device according to various embodiments of the disclosure may be configured with one or more components, and the name of a corresponding element may be different depending on the type of electronic device. The electronic device according to various embodiments of the disclosure may be configured to include at least one of the above-described elements, and some of the elements may be omitted or the electronic device may further include an additional element. Furthermore, some of the elements of the electronic device according to various embodiments may be combined to form a single entity, and may perform the same functions as corresponding elements before they are combined.

The term "~unit", "device" or "module" used in various embodiments of the disclosure may mean a unit, including one or a combination of two or more of hardware, software or firmware, for example. The "~unit", "device" or "module" may be interchangeably used with a term, for example, a unit, logic, a logical block, a component or a circuit. The "~unit", "device" or "module" may be a minimum unit of an integrated part or a part thereof. The "~unit", "device" or "module" may be a minimum unit in which one or more functions are performed or a part thereof. The "~unit", "device" or "module" may be implemented mechanically or electronically. For example, the "~unit", "device" or "module" according to various embodiments of the disclosure may include at least one of an application-specific integrated circuit (ASIC) chip, field-programmable gate arrays (FPGAs) and a programmable-logic device, which have been known or are to be developed and which perform certain operations.

The embodiments of the disclosure disclosed in the specification and drawings have merely presented specific examples in order to easily describe the technological contents of the disclosure and to help understanding of the disclosure, but are not intended to limit the scope of the disclosure. Accordingly, the scope of the disclosure should be construed as including all changes or modified forms derived based on the technical spirit of the disclosure in addition to the disclosed embodiments.

The invention claimed is:

1. A method for an electronic device to authenticate a smart key, the method comprising:
   transmitting a first authentication request;
   receiving a first authentication response in response to the first authentication request from the smart key device;
   transmitting a second authentication request after receiving the first authentication response;
   receiving a second authentication response in response to the second authentication request from the smart key device;
   determining an interval between a first time when the first authentication response is received and a second time when the second authentication response is received;
   identifying that a relay attack does not occur in case that the interval is within a pre-determined duration;
   identifying that the relay attack occurs in case that the interval between the received first and second authentication responses exceeds the pre-determined duration;
   authenticating the smart key device in case that the relay attack does not occur; and
   transmitting an approach confirmation signal in case that the smart key device is authenticated.

2. The method of claim 1, further comprising performing at least one of vehicle function restriction, vehicle warning notification, or situation notification for the smart key device in case that the relay attack occurs.

3. The method of claim 1, further comprising:
   performing channel measurement on the smart key device and feeding a measurement result back to the smart key device;
   identifying whether data, previously agreed to be transmitted, are validly received from the smart key device; and
   authenticating the smart key device in case that data are validly received,
   wherein the smart key device transmits data based on the measurement result.

4. An authentication method of a smart key device, the method comprising:
   receiving a first authentication request from a vehicle;
   transmitting a first authentication response in response to the first authentication request to the vehicle;
   receiving a second authentication request from the vehicle;
   determining an interval between a first time when the first authentication response is received and a second time when the second authentication response is received;

identifying that a relay attack does not occur in case that the interval is within a pre-determined duration;

identifying that the relay attack occurs in case that the interval between the received first and second authentication requests exceeds the pre-determined duration; and receiving an approach confirmation signal in case that the smart key device is authenticated.

5. The method of claim 4, further comprising performing at least one of vehicle function restriction, vehicle warning notification, or warning notification for the smart key device in case that the relay attack occurs.

6. The method of claim 4, further comprising:

receiving a channel measurement result from the vehicle; and transmitting data, previously agreed to be transmitted, to the vehicle based on the channel measurement result, wherein the smart key device is authenticated in case that data are validly received by the vehicle.

7. An electronic device, comprising:

a transceiver; and a controller configured to:

transmit a first authentication request, receive a first authentication response in response to the first authentication request from a smart key device, transmit a second authentication request, receive a second authentication response in response to the second authentication request from the smart key device, determine an interval between a first time when the first authentication response is received and a second time when the second authentication response is received, identify a relay attack does not occur in case that the interval is within a pre-determined duration, identify the relay attack occurs in case that the interval between the received first and second authentication responses exceeds the pre-determined duration, authenticate the smart key device in case that the relay attack does not occur, and transmit an approach confirmation signal in case that the smart key device is authenticated.

8. The electronic device of claim 7, wherein the controller is configured to perform at least one of vehicle function restriction, vehicle warning notification, or situation notification for the smart key device in case that the relay attack occurs.

9. The electronic device of claim 7, wherein:

the controller is configured to perform channel measurement on the smart key device and feeding a measurement result back to the smart key, identify whether data, previously agreed to be transmitted, are validly received from the smart key device, and authenticate the smart key device in case that data are validly received, and the smart key device transmits data based on the measurement result.

10. A smart key device, the smart key device comprising:

a transceiver; and a controller configured to:

receive a first authentication request from a vehicle, transmit a first authentication response in response to the first authentication request to the vehicle, receive a second authentication request from the vehicle, determine an interval between a first time when the first authentication response is received and a second time when the second authentication response is received, identify that a relay attack does not occur in case that the interval is within a pre-determined duration, identify that the relay attack occurs in case that the interval between the received first and second authentication requests exceeds the pre-determined duration, and receiving an approach confirmation signal in case that the smart key device is authenticated.

11. The smart key device of claim 10, wherein the controller is configured to:

perform at least one of vehicle function restriction, vehicle warning notification, or warning notification for the smart key device in case that the relay attack occurs.

12. The smart key device of claim 10, wherein the controller is configured to:

receive a channel measurement result from the vehicle; and transmit data, previously agreed to be transmitted, to the vehicle based on the channel measurement result, wherein the smart key device is authenticated in case that data are validly received by the vehicle.

\* \* \* \* \*